United States Patent
Sebert

(10) Patent No.: US 7,303,185 B2
(45) Date of Patent: Dec. 4, 2007

(54) DAMPING ARRANGEMENT WITH A CABLE LOOP ARRANGEMENT SERVING AS A DAMPING MEMBER

(75) Inventor: Karl Sebert, Kirchheim/Teck (DE)

(73) Assignee: Sebert Schwingungstechnik GmbH, Kirchheim/Teck (DE)

( * ) Notice: Subject to any disclaimer, the term of this patent is extended or adjusted under 35 U.S.C. 154(b) by 71 days.

(21) Appl. No.: 10/946,008

(22) Filed: Sep. 22, 2004

(65) Prior Publication Data
US 2005/0070149 A1    Mar. 31, 2005

(30) Foreign Application Priority Data
Sep. 25, 2003    (DE) ................. 103 44 541

(51) Int. Cl.
*F16F 1/36*    (2006.01)
(52) U.S. Cl. ................... 267/147; 248/560
(58) Field of Classification Search ............ 267/147, 267/148, 160, 136, 166; 248/560, 636, 638
See application file for complete search history.

(56) References Cited

U.S. PATENT DOCUMENTS

| | | | |
|---|---|---|---|
| 3,204,913 A | 9/1965 | Lawrence et al. | |
| 5,169,110 A * | 12/1992 | Snaith et al. | ............... 248/570 |
| 6,244,579 B1 | 6/2001 | Latvis, Jr. | |
| 6,290,217 B1 | 9/2001 | Schneider et al. | |
| 6,406,011 B1 | 6/2002 | Kosar et al. | |
| 6,629,688 B1 * | 10/2003 | Sebert | ...................... 267/147 |

FOREIGN PATENT DOCUMENTS

| | | |
|---|---|---|
| DE | 296 10 412 U1 | 8/1996 |
| DE | 202 04 928 U1 | 6/2002 |
| EP | 0 813 203 A1 | 12/1997 |
| EP | 1 122 458 A1 | 8/2001 |
| EP | 2 231 646 A2 | 9/2001 |
| EP | 1 138 974 A2 | 10/2001 |
| FR | 2 601 739 A | 1/1988 |

\* cited by examiner

*Primary Examiner*—Khiem Nguyen
(74) *Attorney, Agent, or Firm*—Browdy and Neimark, PLLC

(57) ABSTRACT

A damping arrangement or isolator has two terminal members which are connected with each other by a single closed-loop cable band arrangement serving as a damping member. The terminal members each possess at least two eyes to receive the cable strap in the open position of the eyes and means for clamping the cable strap by closing the eyes, said cable strap extending in an alternating fashion from one eye of the one terminal member to an eye in the other terminal member. Accordingly an extremely rapid and simple assembly of the damping arrangement is possible and very even resilient and damping properties are ensured.

8 Claims, 2 Drawing Sheets

DAMPING ARRANGEMENT WITH A CABLE LOOP ARRANGEMENT SERVING AS A DAMPING MEMBER

BACKGROUND OF THE INVENTION

The invention relates to a damping arrangement or isolator having two terminal members which are connected with each other by a cable loop arrangement serving as a damping member.

THE PRIOR ART

In the case of a known damping arrangement of this type the plate-like terminal member possess holes, the cable ends being able to be threaded into such holes and squeezed therein. Threading is here complex and time consuming and furthermore the characteristics are irregular.

SHORT SUMMARY OF THE INVENTION

One object of the invention is to improve a damping arrangement of the type initially mentioned so that assembly is less time consuming and more regular characteristics may be ensured.

In order to achieve these and/or other objects appearing from the present specification, claims and drawings, in the present invention the cable loop arrangement is constituted by a single closed-loop cable strap and the terminal members possess at least two eyes to receive the cable strap in the open position of the eyes and means for clamping the cable strap by closing the eyes, said cable strap extending in an alternating fashion from one eye of the one terminal member to an eye in the other terminal member.

The damping arrangement in accordance with the invention has the advantage that awkward threading operation is no longer involved and the single closed-loop cable strap merely has to be laid in the eyes following which it is locked in position. The use of a single closed-loop cable strap however leads not only to simpler assembly but also means that more reproducible characteristics are possible as regards the resilient action and the damping effect. The closed-loop cable strap extends extremely regularly between the terminal members and loosening of cable ends in holes is no longer possible.

The features recited in the claims represent advantageous further developments and improvements of the novel damping arrangement.

In accordance with a preferred embodiment at least one of the terminal members comprises two separate elements able to be locked together, the eyes being between same in the assembled state. These eyes are in this case preferably in the form of grooves in the two separate elements or are only formed in one element, which preferably extend athwart the longitudinal direction of the terminal members. This renders possible a particularly simple insertion of the cable straps prior to fixing or clamping together of the individual elements.

The separate elements of the terminal member are in this case preferably designed in the form of plates and may be fixed together by means of screws, rivets such as hollow rivets, Tox fasteners, or by clamping together or bonding.

In the case of a further advantageous design of the invention at least one of the terminal members is provided with inflexible holding lugs as a means for clamping, the eyes being designed as abutment points for the cable strap on the holding lugs. Here again simple assembly is possible by insertion or by engagement of the cable strap with the holding lugs, which then only have to be bent over to lock the cable strap in position. Such operation may be implemented using a suitable bending device in a single working step.

A particularly satisfactory locking or fixing effect for the cable strap is achieved if the eyes are respectively constituted by engagement points on at least two adjacently placed holding lugs.

Manufacture is more particularly simple and economic if the holding lugs are respectively integrally formed on a sheet metal member serving as the terminal member. Such sheet metal members may for example be produced by stamping.

For fitting the finished damping arrangement in position the terminal members are preferably provided with securing holes.

An arrangement which has proved to be particularly apt is one in which two parallel member parts of the cable strap are attached to each terminal member at a distance apart, the one parts of the terminal member running perpendicularly to those of the other member part. This leads to a particularly advantageous configuration of the cable strap employed as a damping member.

Quick and precise assembly is furthermore aided if the cable strap is provided with positioning elements, which are equally spaced apart, for precisely positioned placement in the eyes.

Particularly favorable damping properties are ensured by the design of the cable strap as a metal rope and more especially as a steel rope.

Further advantageous developments and convenient forms of the invention will be understood from the following detailed descriptive disclosure of two embodiments thereof in conjunction with the accompanying drawings.

LIST OF THE SEVERAL VIEWS OF THE FIGURES

DETAILED ACCOUNT OF WORKING EMBODIMENTS OF THE INVENTION

Figure 1:
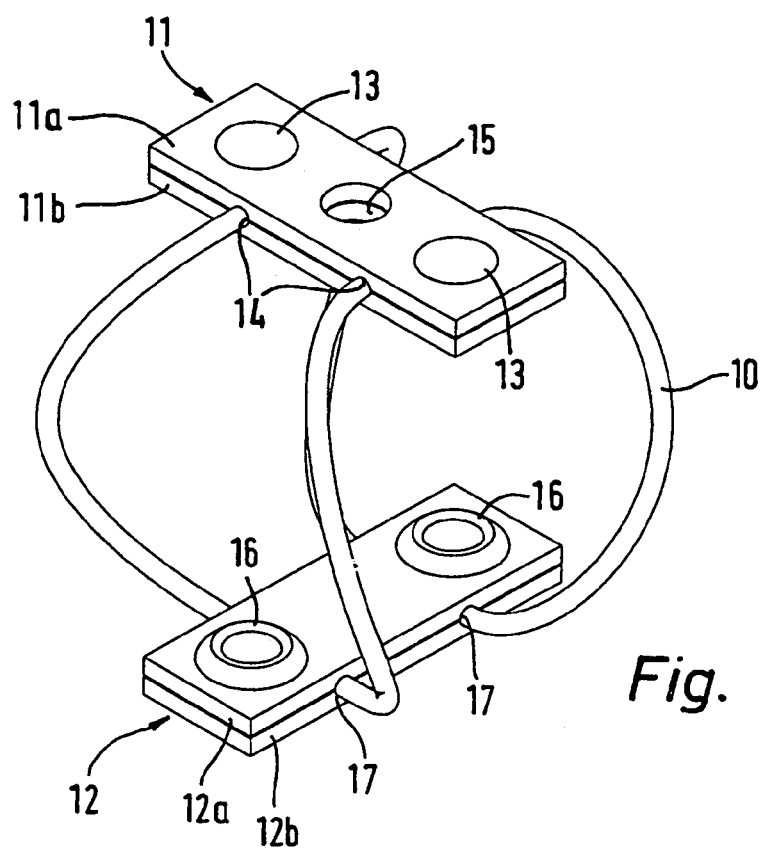
FIG. 1 is a perspective elevation of a damping arrangement with terminal members, which respectively comprise two separate elements able to be locked or fixed together as a first embodiment of the invention.
Figure 2:
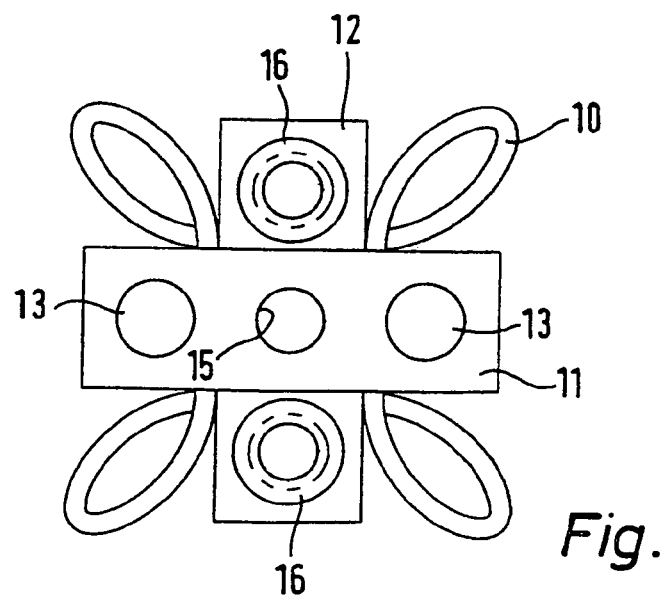
FIG. 2 is a plan view of the damping arrangement represented in FIG. 1.

In the first working example of FIGS. 1 and 2 as a damping arrangement having resilient properties a single closed-loop cable band 10 serves as a damping and resilient member. It is in the form of a steel rope, although in lieu of steel other metals can be employed, which possess corresponding resilient properties in accordance with the type of application. In the case of the resilient movement of the damping arrangement the metal wire elements of the rope rub together and ensure the desired damping properties. If the requirements as regards the damping properties are not particularly exacting, the cable strap may also be in the form of a thick wire.

The cable strap 10 runs between two terminal members 11 and 12, which respectively comprise two plate-like separate elements 11a and 11b and respectively 12a and 12b. The separate elements 11a and 11b are locked or fixed together by the intermediary of rivets 13 and thus clamp two regions, extending in parallelism and perpendicularly to the longitudinal direction of the terminal member 11, of the cable strap 10 between them. For this purpose the separate elements 11a and 11b possess, at their facing sides, transverse grooves 14 to receive the said regions of the cable strap. In principle only one of the separate elements 11a and 11b could be provided with a transverse groove 14, which would be correspondingly deeper, whereas the other separate element would be devoid of any such transverse groove. A central attachment hole 15 is arranged between the locked regions of the cable strap in the terminal member 11.

The two separate elements 12a and 12b of the other terminal member 12 are locked together by means of two hollow rivets 16, two parallel regions of the cable strap 10 again being clamped therebetween in a corresponding fashion. Here as well transverse grooves 17 serve to receive such regions of the cable strap 10.

The two regions of the cable strap 10 gripped in the terminal member 11 run athwart the two regions, clamped in the terminal member 12, of this cable strap 10. In this case the cable strap 10 extends respectively alternatingly from one terminal member to the other terminal member so that the course of the cable strap 10 indicated in FIGS. 1 and 2 results.

As a modification of the working example illustrated it is also possible for all rivets to be hollow rivets or for all rivets to be normal full rivets, it being possible for attachment holes 15 to be provided in accordance with requirements in the two terminal members 11 and 12 as well. In lieu of the attachment together of the separate elements 11a and 11b and respectively 12a and 12b of the two terminal members 11 and 12 using rivets, other known attachment means may be employed, for example attachment by screws, by jamming, by plastic deformation of the material, by Tox fasteners, by bonding or the like. Furthermore a combinations of such attachment means or methods are possible.

Figure 3:
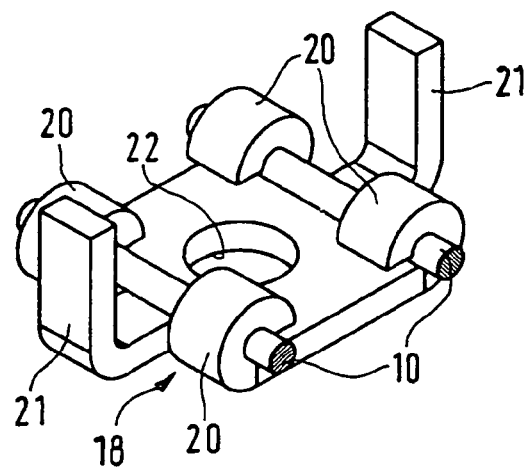
FIG. 3 is a perspective elevation of a terminal member in the locked state of the cable strap for use in a damping arrangement according to a second embodiment of the invention.
Figure 4:
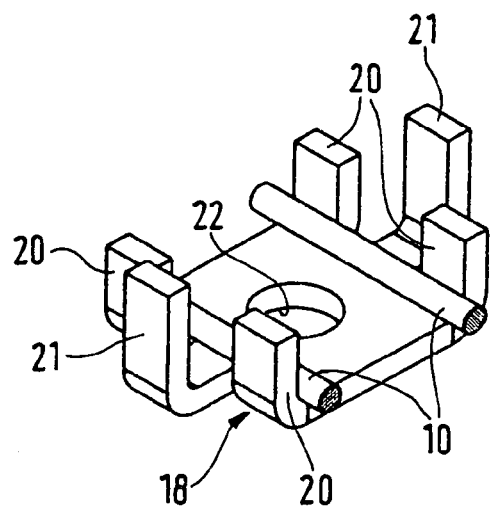
FIG. 4 shows the same holding lugs still open so that the member parts for the cable strap are not locked.
Figure 5:
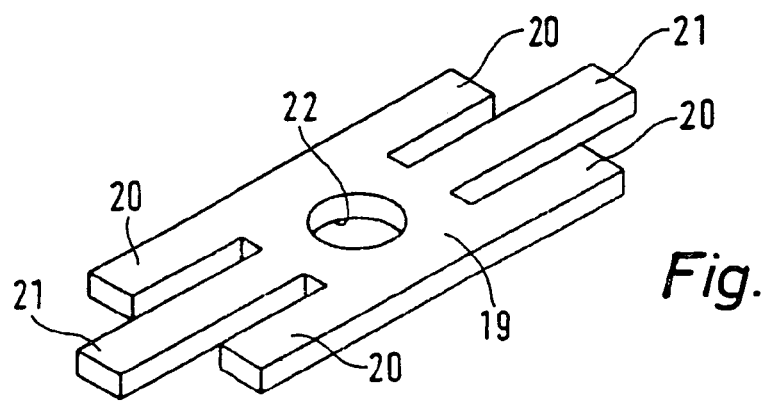
FIG. 5 shows a stamped sheet metal part from which the terminal members are formed in the second embodiment.

In the case of the second working example depicted in FIGS. 3 through 5 only one of two terminal members 18 is illustrated in order to make the drawing more straightforward and in such terminal member, see FIG. 3, two parallel regions of the cable strap 10 are locked or fixed. The course of the cable strap 10 between two such terminate members 18 is as in the first embodiment.

The terminal members 18 comprise two stamped sheet metal parts 19, FIG. 5 showing one such stamped sheet metal part 19. In principle it is H-shaped in design, the four limbs, see FIG. 4, being bent upright and constituting holding lugs 20. Between two respective holding lugs 20 a further lug-like securing element 21 is integrally formed, which is also bent upright, the two securing elements 21 serving for preventing rotation of the respective terminal member 18 and for this purpose fit into corresponding recesses, not illustrated, in one terminal member. In the state depicted in FIG. 4 of the terminal members 18 the cable strap 10 is so placed in position that its two regions to be secured abut two upwardly bent holding lugs 20 and the upwardly bent holding lugs 20 simultaneously define eyes for the insertion of the cable strap 10. After this the holding lug 20 are bent over in accordance with FIG. 3 in order in this fashion to clamp and lock the two parallel regions of the cable strap 10. Using a suitable tool it is possible, for example, to bend over all four holding lug 20 of a terminal member 18 simultaneously. A central attachment hole 22 in the terminal members 18 serves to secure same to a cooperating member, not illustrated.

The cable strap 10 is so laid in the terminal members 11 and 12 that the four locked regions are at respectively equal distances apart. In order to exactly and simply fulfill this requirement on insertion in a simple manner the cable strap may be provided, in a fashion not indicated, at four points, with insertion aids which are equally spaced apart, and which are for example in the form of clamping elements such as clamping or crimping sleeves. In this case at each attachment point, for example, two such sleeves or the like may be provided whose distance apart is the same as the width of a terminal member 11 and 12 or of a terminal member 18. Furthermore, it is possible to provide only one insertion aid or the like at an attachment point, although however in this case the terminal member 11 and 12 and, respectively, 18 should have corresponding recesses or wells to receive such sleeves or the like.

Moreover, designs are conceivable in which the terminal members are not designed for securing only two regions of the cable strap, and are constituted by a larger number of regions, as for example four regions. In this case the cable strap 10 would not only extend as in the working examples four times between the terminal member backward and forward but eight times.

The invention claimed is:

1. A damping arrangement having two terminal members which are connected with each other by a cable loop arrangement serving as a damping member, wherein the cable loop arrangement is constituted by a single closed-loop cable strap and the terminal members possess at least two eyes to receive the cable strap in the open position of the eyes and means for clamping the cable strap by closing the eyes, said cable strap extending in an alternating fashion from one eye of the one terminal member to an eye in the other terminal member, and further wherein at least one of the terminal members is provided with pliable holding lugs as means for clamping, the eyes being in the form of engagement points for the cable strap at the holding lugs.

2. The damping arrangement as set forth in claim 1, wherein the engagement points respectively define eyes at two adjacently placed holding lugs at least.

3. The damping arrangement as set forth in claim 1, wherein the holding lugs are formed respectively integrally on a sheet metal member functioning as a terminal member.

4. The damping arrangement as set forth in claim 1, wherein the terminal members are provided with locking holes.

5. The damping arrangement as set forth in claim 1, wherein at each terminal member two parallel member parts of the cable strap are locked spaced apart, the parts extending at one terminal member part being perpendicular to those of the other member part.

6. The damping arrangement as set forth in claim 1, wherein at four equally spaced points the cable strap is provided with positioning elements for precisely positioned insertion into the eyes.

7. The damping arrangement as set forth in claim 1, wherein the cable strap is in the form of a metal wire rope and more especially in the form of a steel wire rope.

8. The damping arrangement as set forth in claim 1, wherein the terminal members comprise means for preventing twisting.

* * * * *